United States Patent [19]

Ishiguro et al.

[11] Patent Number: 5,211,770
[45] Date of Patent: May 18, 1993

[54] MAGNETIC RECORDING POWDER HAVING A HIGH COERCIVE FORCE AT ROOM TEMPERATURES AND A LOW CURIE POINT

[75] Inventors: Ginya Ishiguro, Tokyo; Kouichi Ishiyama, Ohmiya; Yoshinari Ishii, Ohmiya; Takuo Takeshita, Ohmiya; Hachiro Saito; Yasuaki Yoshioka, both of Tokyo, all of Japan

[73] Assignees: Mitsubishi Materials Corporation; Nippon Telegraph and Telephone Corporation; Dai Nippon Insatsu Kabushiki Kaisha, all of Tokyo, Japan

[21] Appl. No.: 921,843

[22] Filed: Jul. 29, 1992

Related U.S. Application Data

[63] Continuation-in-part of Ser. No. 671,260, Mar. 18, 1991, abandoned.

[30] Foreign Application Priority Data

Mar. 22, 1990 [JP] Japan .................................. 2-72840

[51] Int. Cl.⁵ ............................................ H01F 1/053
[52] U.S. Cl. ..................................................... 148/302
[58] Field of Search .................. 148/302; 420/83, 121, 420/40, 62, 64, 72, 74, 77, 79, 103, 104, 120

[56] References Cited

U.S. PATENT DOCUMENTS

| | | | |
|---|---|---|---|
| 4,792,368 | 12/1988 | Sagawa et al. | 148/302 |
| 4,802,931 | 2/1989 | Croat | 148/302 |
| 4,975,130 | 12/1990 | Matsuura et al. | 148/302 |
| 5,015,307 | 5/1991 | Shimotomai et al. | 148/302 |

FOREIGN PATENT DOCUMENTS

| | | |
|---|---|---|
| 59-229461 | 12/1984 | Japan . |
| 60-144909 | 7/1985 | Japan . |
| 61-51901 | 3/1986 | Japan . |
| 61-119651 | 6/1986 | Japan . |

*Primary Examiner*—John P. Sheehan
*Attorney, Agent, or Firm*—Frishauf, Holtz, Goodman & Woodward

[57] ABSTRACT

A magnetic recording powder for use as a material for magnetic recording media including magnetic tapes and magnetic cards, the powder having a high coercive force at room temperatures and a low Curie point, consists of at least one element selected from the group consisting of Y and rare-earth elements (R): 5–20 atomic %, B: 5–20 atomic %, Mn: 4–20 atomic %; and Fe and inevitable impurities: the balance. If required, the powder may further contain Al: 1–10 atomic %, and/or Cr: 1–10 atomic %. The powder has a mean particle size of 0.5–2 $\mu$m and a mean crystal grain size of 0.1–0.4 $\mu$m.

14 Claims, 4 Drawing Sheets (600 MAGNIFICATIONS)

(600 MAGNIFICATIONS)

(10,000 MAGNIFICATIONS)

(100,000 MAGNIFICATIONS)

a # MAGNETIC RECORDING POWDER HAVING A HIGH COERCIVE FORCE AT ROOM TEMPERATURES AND A LOW CURIE POINT

This application is a continuation-in-part application of application Ser. No. 07/671,260 filed Mar. 18, 1991 now abandoned.

BACKGROUND OF THE INVENTION

1. Field of the Invention

This invention relates to a magnetic recording powder for use as a material for magnetic recording media such as magnetic tapes and magnetic cards, and more particularly to a magnetic recording powder of this kind which has a high coercive force at room temperatures and a low Curie point.

2. Description of the Prior Art

Conventionally known magnetic recording powders of this kind include $\gamma$-$Fe_2O_3$ powders, Ba ferrite powders, $RCo_5$ powders (R is an element selected from rare-earth elements including yttrium. Sm is mainly used as R), and Nd-Fe-B alloy powders as disclosed in Japanese Provisional Patent Publication (Kokai) No. 59-229461. The coercive force (iHc) at room temperatures and Curie point (Tc) of these conventional magnetic recording powders are shown in Table 1.

TABLE 1

| Kind of Magnetic Recording Powder | Coercive Force iHc (Oe) | Curie Point Tc (°C.) |
|---|---|---|
| $\gamma$-$Fe_2O_3$ powder | Appox. 400 | Approx. 600 |
| Ba Ferrite Powder | Approx. 3000 | Approx. 450 |
| $RCo_5$ Powder | 10000 or more | Approx. 700 |
| Nd—Fe—B Alloy Powder | 10000 or more | Approx. 320 |

Magnetic recording media such as magnetic tapes and magnetic cards are manufactured by applying magnetic recording powders over surfaces of tapes or sheets of synthetic resin. To magnetically write or erase a magnetic recording medium thus manufactured, usually the medium is heated to a temperature immediately below the Curie point of the magnetic recording powder forming the medium to have its coercive force reduced, and then the medium is subjected to magnetic writing or erasing while it has a thus reduced coercive force.

However, the aforesaid conventional magnetic recording powders have high Curie points, requiring a great deal of energy to heat to their high Curie Many studies have been made in order to develop magnetic recording powders having low Curie points. However, a problem has been encountered that if a magnetic recording medium in general is improved to have a lower Curie point, it also has a correspondingly reduced coercive force at room temperatures. Particularly, the conventional Nd-Fe-B alloy powders have their coercive forces drastically reduced when they are finely crushed.

SUMMARY OF THE INVENTION

It is therefore the object of the invention to provide a magnetic recording powder having a fine particle size which has a high coercive force at room temperatures and at the same time has a low Curie point.

To attain the object, the present invention provides a magnetic recording powder for use as a material for magnetic recording media including magnetic tapes and magnetic cards, the powder having a high coercive force at room temperatures and a low Curie point, consisting of:

at least one element selected from the group consisting of Y and rare-earth elements (R): 5–20 atomic %;

B: 5–20 atomic %;

Mn: 4–20 atomic %; and

Fe and inevitable impurities: the balance, the powder having a mean particle size of 0.5–2 $\mu$m and a mean crystal grain size of 0.1–0.4 $\mu$m.

If required, the magnetic recording powder according to the invention may further contain Al: 1–10 atomic %;, and/or Cr: 1–10 atomic %.

The above and other objects, features, and advantages of the invention will be more apparent from the following detailed description.

DETAILED DESCRIPTION

Figure 1:
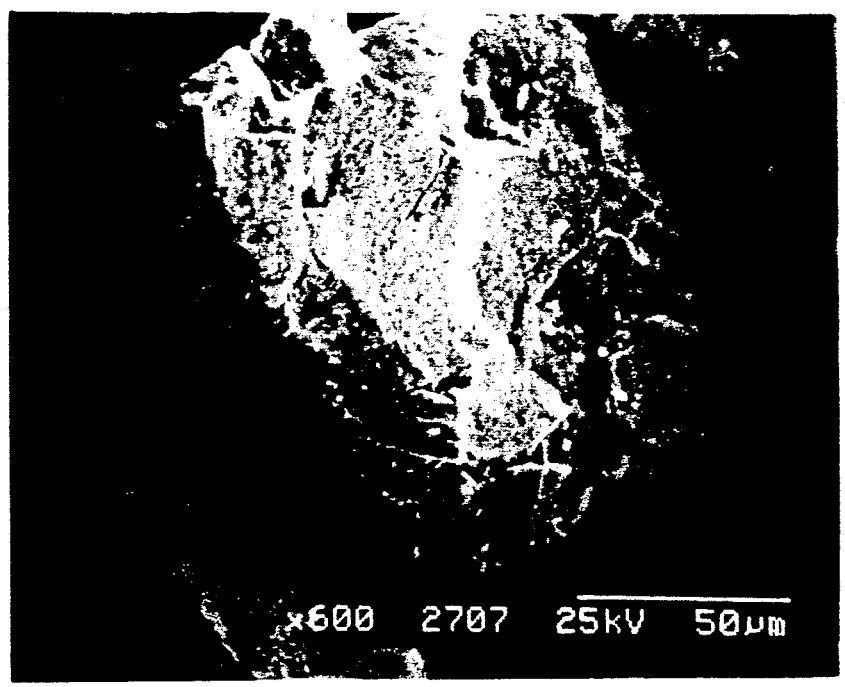
FIG. 1 is a microphotograph showing, on a scale of 600 magnifications, a surface of a magnetic recording powder according to Example 7 of the present invention, which has been crushed by a mortar.

Under the aforesaid circumstances, the present inventors have made studies in order to develop a magnetic recording powder having a fine particle size which has a lower Curie point and at the same time has a high coercive force at room temperatures. As a result, they reached the following finding:

An alloy powder which is formed by adding Mn in an amount of 4–20 atomic % to an alloy consisting essentially of 5–20 atomic % of at least one element selected from the group consisting of Y and rare-earth elements (hereinafter abbreviated as R), 5–20 atomic % of B, and the balance of Fe and inevitable impurities, or an alloy powder which is formed by adding Mn in an amount of 4–20 atomic %, and one or both of Al in an amount of 1–10 atomic %, and Cr in an amount of 1–10 atomic % has a high coercive force at room temperatures and at the same time has a low Curie point, if the mean particle size of the alloy powder is adjusted to a range of 0.5 to 2$\mu$m and the means crystal grain size to a range of 0.1 to 0.4$\mu$m.

The present invention is based upon the above finding.

Magnetic recording powders according to the invention have the aforesaid chemical compositions. R includes at least one of Nd, Pr, La, Ce, Tb, Dy, Ho, Er, Eu, Sm, Gd, Pm, Tm, Yb, and Y. Nd and Dy are particularly preferable.

The reasons why the percentages of the component elements, the mean particle size, and the mean crystal grain size have been limited to the aforesaid ranges will be explained hereinbelow:

(1) R:

R acts to enhance the coercive force at room temperatures of the powder. However, if the R content is less than 5 atomic %, a cubic structure which is identical with that of α iron appears in large quantities, which hinders the powder from having a sufficient coercive force. On the other hand, if R is contained in an amount exceeding 20 atomic %, many nonmagnetic phases which are rich with R are formed, so that the resulting powder has reduced saturation magnetization and can be oxidized. Therefore, the R content has been limited to 5-20 atomic %. The preferable R content is 10-15 atomic %.

(2) B:

B acts to enhance the coercive force at room temperatures of the powder, like R. However, if the B content is less than 5 atomic %, the resulting powder has a rhombohedral structure which hinders the powder from having a sufficient coercive force, whereas if B is contained in excess of 20 atomic %, the resulting powder will have reduced saturation magnetization and hence a reduced coercive force. Therefore, the B content has been limited to 5-20 atomic %, preferably 5-10 atomic %.

(3) Mn:

Mn acts to lower the Curie point of the powder when it is contained in an R-B-Fe magnet alloy. However, if the Mn content is less than 4 atomic %, the above action cannot be obtained, whereas if the Mn content exceeds 20 atomic %, the resulting powder will have a reduced coercive force at room temperatures. This is why the Mn content has been limited to 4-20 atomic %, preferably 4-12 atomic %.

(4) Al and Cr:

Al and/or Cr acts to further lower the Curie point when Al and/or Cr is added to an R-B-Fe magnet alloy together with Mn. However, if Al and/or Cr is contained in an amount less than 1 atomic %, the above action cannot be performed to an appreciable degree, whereas if Al and/or Cr is contained in excess of 10 atomic %, the resulting powder will have a reduced coercive force at room temperatures. Therefore, the Al and/or Cr content has been limited to 1-10 atomic %, preferably 3-10 atomic %.

However, the addition of one or both of Al and Cr together with Mn must satisfy a condition of 5 atomic % $\leq$ Mn+Al+Cr $\leq$ 20 atomic % to secure the action of further lowering the Curie point and at the same time prevent a decrease in the coercive force at room temperatures.

(5) Mean Particle Size:

If the magnetic recording powder according to the invention has a mean particle size of less than 0.5 $\mu$m, it will have a drastically reduced coercive force. Further, if the mean particle size is less than 0.5 $\mu$m, the powder will also have degraded properties due to oxidization with aging and even can kindle. On the other hand, if the mean particle size exceeds 2 $\mu$m, a magnetic card or a magnetic tape formed of the powder will suffer from so-called medium noise during reproduction and even have degraded recording density. Therefore, the mean particle size has been limited to 0.5-2 $\mu$m, preferably 0.7-1.5 $\mu$m.

(6) Mean Crystal Grain Size:

If the mean particle size is within a range of 0.5 to 2 $\mu$m, the magnetic recording powder according to the invention has a fine crystal grain structure. However, if the mean crystal grain size of the fine crystal grains is less than 0.1 $\mu$m, the powder will have degraded magnetizability such that even if heated to a temperature immediately below its Curie point, it cannot accomplish recording with ordinary magnetic writing, whereas if the mean crystal grain size exceeds 0.4 $\mu$m, there can occur transcrystalline cracks, resulting in an insufficient coercive force, if the mean particle size is decreased to the range mentioned in the paragraph (5) above. Therefore, the mean crystsl grain size has been limited to 0.1-0.4 $\mu$m, preferably 0.2-0.4 $\mu$m.

Examples of the invention will now be explained.

Examples

Prepared as starting materials were pure iron, a metal Nd, a metal Dy, an Fe-B alloy (B: 20%), an Fe-Mn alloy (Mn: 75%), an Fe-Al alloy (Al: 50%), and an Fe-Cr alloy (Cr: 60%). These starting materials were melted in a high-frequency smelting furnace and cast into rare-earth alloy ingots having chemical compositions shown at respective Examples Nos. 1-18 according to the present invention and Comparative Examples Nos. 1-10 in Table 2.

These ingots were coarsely crushed by a stamping mill in an Ar gas atmosphere, and then finely crushed by a vibrating ball mill into fine rare-earth alloy powders. The fine rare-earth alloy powders were each charged in an appropriate amount into a boat, which was in turn charged into a heat-treating furnace. The interior of the furnace was evacuated to a vacuum of $0.1 \times 10^{-5}$ Torr, followed by introducing a hydrogen gas under 1 atm into the furnace. Then, the interior of the furnace was heated from a room temperature to 850° C. while the hydrogen gas pressure was maintained at 1 atm. After 850° C. was reached, the furnace interior was evacuated for 30 minutes to 2 hours while the furnace temperature was maintained at 850° C. so that the furnace interior atmosphere was again brought into a vacuum of $1.0 \times 10^{-5}$ Torr.

Thereafter, an Ar gas was introduced into the heat-treating furnace until the furnace interior pressure increased to 1 atm, whereby the fine powders were rapidly cooled. The resulting agglomerate powders were crushed by a mortar, and then finely crushed by a vibrating ball mill into magnetic recording powders having mean particle sizes and mean crystal grain sizes shown in Table 2.

The coercive force (iHc) at a room temperature and Curie point (Tc) of the magnetic recording powders thus obtained, i.e. Examples Nos. 1-18 according to the present invention and Comparative Examples Nos. 1-10 were measured, the results of which are shown in Table 2.

It will be learned from Table 2 that all the magnetic recording powders of Examples Nos. 1-18 according to the present invention are lower in Curie point than the be conventional magnetic recording powders shown in Table 1, and further the former powders are so high in coercive force at room temperatures that they can be satisfactorily used as magnetic recording powders. On the other hand, satisfactory results cannot be obtained with magnetic recording powders of Comparative Examples Nos. 1-8 wherein R, Mn, Al or Cr are contained in amounts falling outside the range of the present invention, and/or one or both of the mean particle size and the mean crystal grain size shown values falling outside the range of the present invention (In Table 2, the asterisked content values fall outside the range of the present invention).

TABLE 2

| SPECIMEN | COMPOSITION OF RARE-EARTH ALLOY INGOT (ATOMIC %) | | | | | | | MEAN PARTICLE SIZE OF M.R. POWDER ($\mu$m) | MEAN CRYSTAL GRAIN SIZE OF M.R. POWDER ($\mu$m) | MAGNETIC PROPERTIES | |
|---|---|---|---|---|---|---|---|---|---|---|---|
| | Nd | Dy | B | Mn | Al | Cr | Fe & INEVITABLE IMPURITIES | | | COERCIVE FORCE iHc (Oe) | CURIE POINT Tc (°C.) |
| EXAMPLES ACCORDING TO PRESENT INVENTION | | | | | | | | | | | |
| 1 | 11 | 3 | 5 | 12 | — | — | Bal. | 1.5 | 0.4 | 8,000 | 100 |
| 2 | 15 | — | 8 | 4 | — | — | Bal. | 1.0 | 0.4 | 9,000 | 200 |
| 3 | 11 | 3 | 5 | 8 | — | — | Bal. | 0.7 | 0.3 | 5,000 | 150 |
| 4 | 8 | 8 | 8 | 16 | — | — | Bal. | 0.5 | 0.3 | 1,500 | 80 |
| 5 | 8 | 8 | 8 | 20 | — | — | Bal. | 0.5 | 0.4 | 1,000 | 60 |
| 6 | 14 | — | 5 | 8 | 1 | — | Bal. | 1.2 | 0.4 | 7,500 | 130 |
| 7 | 14 | — | 5 | 6 | 3 | — | Bal. | 0.8 | 0.3 | 9,000 | 180 |
| 8 | 14 | — | 5 | 6 | 6 | — | Bal. | 0.8 | 0.4 | 6,000 | 150 |
| 9 | 10 | 5 | 5 | 6 | 9 | — | Bal. | 0.6 | 0.3 | 5,000 | 100 |
| 10 | 11 | 3 | 5 | 4 | — | 2 | Bal. | 2.0 | 0.4 | 9,000 | 150 |
| 11 | 11 | 3 | 5 | 8 | — | 4 | Bal. | 1.5 | 0.4 | 8,000 | 120 |
| 12 | 11 | 3 | 5 | 5 | — | 7 | Bal. | 1.0 | 0.2 | 6,000 | 100 |
| 13 | 10 | 5 | 5 | 4 | — | 10 | Bal. | 0.5 | 0.1 | 4,000 | 100 |
| 14 | 11 | 4 | 5 | 5 | 5 | 5 | Bal. | 0.8 | 0.2 | 6,000 | 100 |
| 15 | 11 | 4 | 5 | 5 | 3 | 7 | Bal. | 0.8 | 0.3 | 4,000 | 80 |
| 16 | 11 | 4 | 5 | 5 | 7 | 5 | Bal. | 0.6 | 0.1 | 5,000 | 60 |
| 17 | 14 | — | 5 | 4 | 4 | 1 | Bal. | 1.0 | 0.2 | 7,000 | 150 |
| 18 | 14 | — | 5 | 8 | 2 | 2 | Bal. | 0.8 | 0.2 | 5,000 | 100 |
| COMPARATIVE EXAMPLES | | | | | | | | | | | |
| 1 | 4* | — | 8 | 6 | — | — | Bal. | 100* | 1.5 | 0 | 700 |
| 2 | 22* | — | 8 | 8 | — | — | Bal. | 1.8 | 1.5 | 60 | 50 |
| 3 | 15 | — | 3* | 8 | — | — | Bal. | 1.2 | 1.0 | 40 | 30 |
| 4 | 15 | — | 23* | 8 | — | — | Bal. | 1.5 | 2.5 | 0 | 30 |
| 5 | 15 | — | 8 | 2* | — | — | Bal. | 0.8 | 0.3 | 10,000 | 310 |
| 6 | 14 | — | 5 | 21* | — | — | Bal. | 1.0 | 0.3 | 100 | 20 |
| 7 | 15 | — | 8 | 8 | 12* | — | Bal. | 0.8 | 0.4 | 0 | 20 |
| 8 | 15 | — | 8 | 8 | — | 12* | Bal. | 2.0 | 0.4 | 50 | 20 |
| 9 | 14 | — | 5 | 6 | 3 | — | Bal. | 0.3* | 0.3 | 300 | 180 |
| 10 | 14 | — | 5 | 6 | 3 | — | Bal. | 0.8 | 0.6* | 800 | 180 |

(ASTERISKED VALUES FALL OUTSIDE RANGE OF PRESENT INVENTION)

Figure 2:
FIG. 2 is a microphotograph showing, on a scale of 10,000 magnifications, the surface of the powder according to Example 7 crushed by the mortar.
Figure 3:
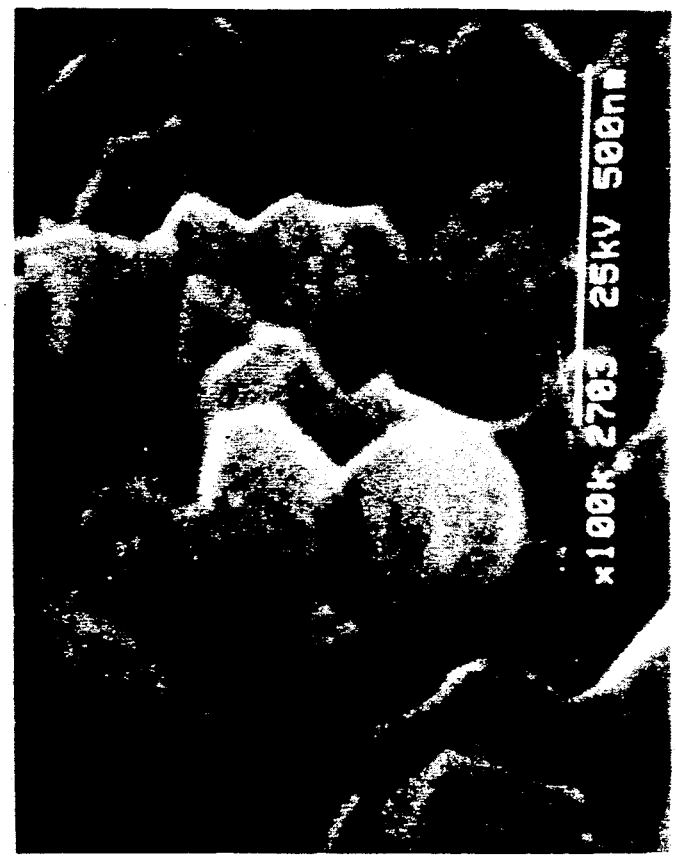
FIG. 3 is a microphotograph showing, on a scale of 100,000 magnifications, the surface of the powder according to Example 7 crushed by the mortar.

Then, to observe the structure of the magnetic recording powder according to the present invention, a powder of Example No. 7 according to the present invention obtained by crushing by a mortar was picked up and its surface structure was inspected and photographed with a scanning electron microscope (SEM) while the microscope was set to different magnifications, to obtain microphotographs of the surface structure of the powder as shown in FIGS. 1-3.

FIG. 1 is a microphotograph of 600 magnifications, FIG. 2 a microphotograph of 10,000 magnifications, and FIG. 3 a microphotograph of 100,000 magnifications.

As is clear from the microphotographs, the fine crystal grains become visible more distinctly as the magnification is increased, making it evident that the magnetic recording powder according to the present invention is formed of fine crystal grains.

Further prepared were specimens of a magnetic recording powder according to the present invention having the same chemical composition with that of Example No. 7 and in which hydrogen is occluded by the aforementioned introduction of hydrogen gas, specimens of a powder obtained by crushing an alloy ingot having the same chemical composition with that of Example No. 7, and specimens of a powder obtained by crushing a sintered magnet having the same chemical composition with that of Example No. 7, the specimens of each powder having different means particle sizes. The coercive force of the specimens was measured in relation to the mean particle size, the results of which are shown in FIG. 4.

Figure 4:
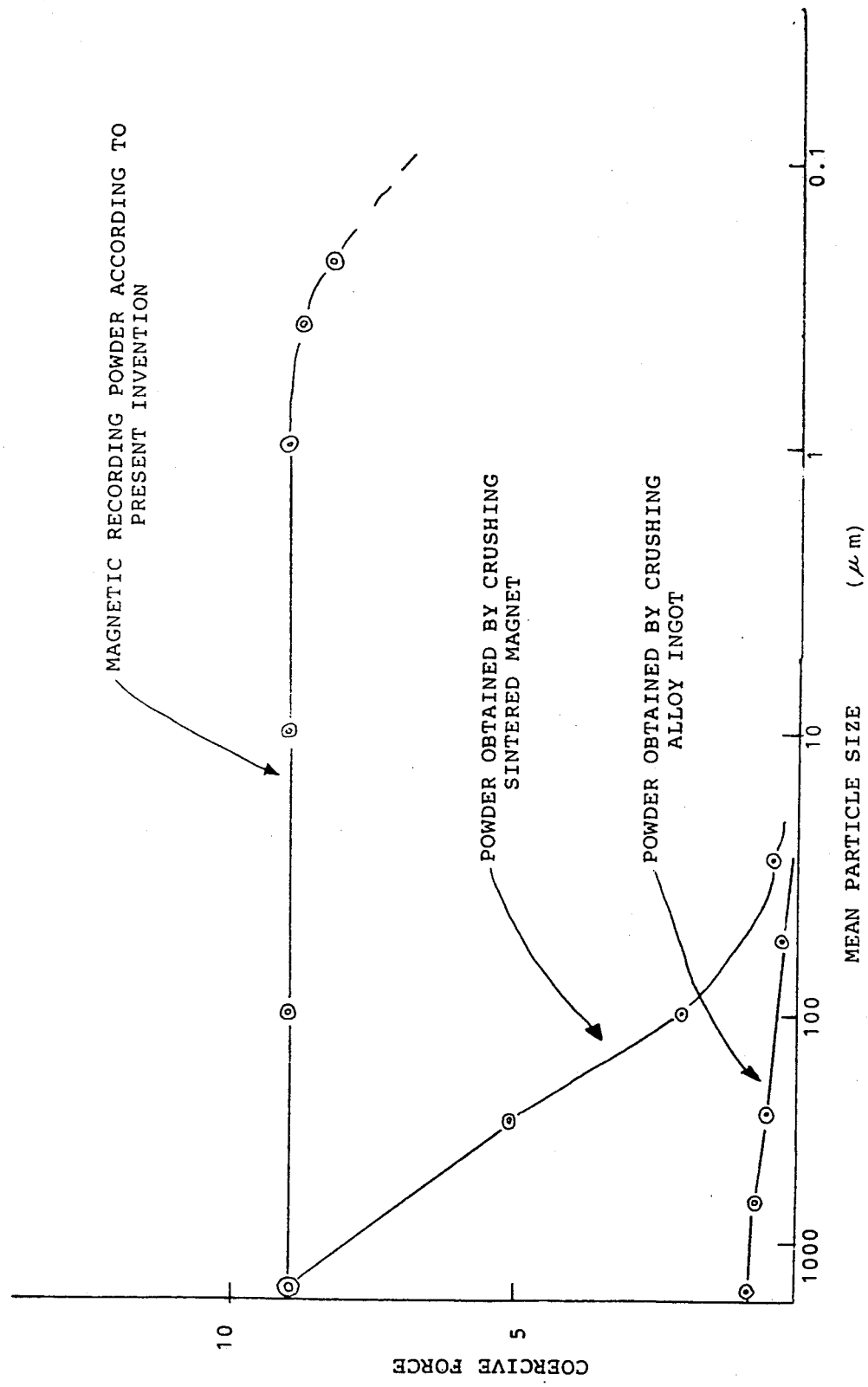
FIG. 4 is a graph showing the relationship between mean particle sizes and coercive forces of magnetic recording powders.

As is learned from FIG. 4, the magnetic recording powder according to the present invention maintains a required coercive force even if it is finely crushed to a means particle size of 0.5 $\mu$m, whereas the powder obtained by crushing the alloy ingot and the powder obtained by crushing the sintered magnet show remarkably decreased coercive force values due to the crushing. More specifically, the powder obtained by crushing the alloy ingot has a coercive force almost equal to 0 KOe when its mean particle size is 30 $\mu$m, while the powder obtained by crushing the sintered magnet has a coercive force equal to 0 KOe when its mean particle size is 20 $\mu$m. Therefore, they are not suitable for use as magnetic recording powders. The reason why the coercive force of the magnetic recording powder according to the present invention does not largely decrease even if the powder is crushed to 0.5-2 $\mu$m presumably lies in the fact that its crystalline structure is formed of fine crystal grains.

As a result, magnetic recording media such as magnetic tapes and magnetic cards formed from magnetic recording powders according to the present invention require only a small deal of energy to heat to a temperature immediately below the Curie point, which enables use of a compact and simple apparatus for heating the media to a temperature immediately below the Curie point. Thus, the invention can contribute to energy saving and is useful industrially.

What is claimed is:

1. A magnetic recording powder for use as a material for magnetic recording media including magnetic tapes and magnetic cards, said powder having a high coercive force at room temperatures and a low Curie point, consisting of:
   at least one element selected from the group consisting of Y and rare-earth elements (R): 5-20 atomic %;
   B: 5-20 atomic %;
   Mn: 4-20 atomic %; and
   Fe and inevitable impurities: the balance, said powder having a means particle size of 0.5-2 μm and a mean crystal grain size of 0.1-0.4 μm.

2. The magnetic recording powder as claimed in claim 1, wherein R: 10-15 atomic %, B: 5-10 atomic %, and Mn: 4-12 atomic %.

3. A magnetic recording powder for use as a material for magnetic recording media including magnetic tapes and magnetic cards, said powder having a high coercive force at room temperatures and a low Curie point, consisting of:
   at least one element selected from the group consisting of Y and rare-earth elements (R): 5-20 atomic %;
   B: 5-20 atomic %;
   Mn: 4-20 atomic %;
   Al: 1-10 atomic %; and
   Fe and inevitable impurities: the balance, said powder having a mean particle size of 0.5-2 μm and a mean crystal grain size of 0.1-0.4 μm.

4. The magnetic recording powder as claimed in claim 3, wherein R: 10-15 atomic %, B: 5-10 atomic %, Mn: 4-12 atomic %, and Al: 3-10 atomic %.

5. A magnetic recording powder for use as a material for magnetic recording media including magnetic tapes and magnetic cards, said powder having a high coercive force at room temperatures and a low Curie point, consisting of:
   at least one element selected from the group consisting of Y and rare-earth elements (R): 5-20 atomic %;
   B: 5-20 atomic %;
   Mn: 4-20 atomic %;
   Cr: 1-10 atomic %; and
   Fe and inevitable impurities: the balance, said powder having a mean particle size of 0.5-2 μm and a mean crystal grain size of 0.1-0.4 μm.

6. The magnetic recording powder as claimed in claim 5, wherein R: 10-15 atomic %, B: 5-10 atomic %, Mn: 4-12 atomic %, and Cr: 3-10 atomic 9.

7. A magnetic recording powder for use as a material for magnetic recording media including magnetic tapes and magnetic cards, said powder having a high coercive force at room temperature and a low Curie point, consisting of:
   at least one element selected from the group consisting of Y and rare-earth elements (R): 5-20 atomic %;
   B: 5-20 atomic %;
   Mn: 4-20 atomic %;
   Al: 1-10 atomic %;
   Cr: 1-10 atomic %: and
   Fe and inevitable impurities: the balance, said powder having a mean particle size of 0.5-2 μm and a mean crystal grain size of 0.1-0.4 μm.

8. The magnetic recording powder as claimed in claim 7, wherein R: 10-15 atomic %, B: 5-10 atomic %, Mn: 4-12 atomic %, Al: 3-10 atomic %, and Cr: 3-10 atomic %.

9. The magnetic recording powder as claimed in any of claims 1-8, wherein said powder has a mean particle size of 0.7-1.5 μm and a means crystal grain size of 0.1-0.4 μm.

10. The magnetic recording powder as claimed in any of claims 1-8, wherein said powder has a mean particle size of 0.5-2 μm and a mean crystal grain size of 0.2-0.4 μm.

11. The magnetic recording powder as claimed in any of claims 1-8, wherein said powder has a mean particle size of 0.7-1.5 μm and a mean crystal grain size of 0.2-0.4 μm.

12. The magnetic recording powder as claimed in claim 7, wherein the total amount of Mn, Al, and Cr satisfies a condition of 5 atomic $\% \leq Mn+Al+Cr \leq 20$ atomic %.

13. The magnetic recording powder as claimed in any of claim 2, 4, 6 or 8, wherein the rare-earth elements comprise Nd.

14. The magnetic recording powder as claimed in claim 2, 4, 6, or 8, wherein the rare-earth elements comprise Nd and Dy.

* * * * *